(12) United States Patent
Brück et al.

(10) Patent No.: US 6,827,909 B1
(45) Date of Patent: Dec. 7, 2004

(54) CATALYTIC CONVERTER, DIESEL ENGINE AND LEAN-BURN ENGINE HAVING A CATALYTIC CONVERTER

(75) Inventors: Rolf Brück, Bergisch Gladbach (DE); Jörg-Roman Konieczny, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 746 days.

(21) Appl. No.: 09/711,868

(22) Filed: Nov. 13, 2000

Related U.S. Application Data

(63) Continuation of application No. PCT/EP99/02997, filed on May 3, 1999.

(30) Foreign Application Priority Data

May 12, 1998 (DE) ........................................ 198 20 971

(51) Int. Cl.$^7$ ............................ B01D 53/34; F01N 3/28
(52) U.S. Cl. ..................... 422/180; 422/177; 60/299
(58) Field of Search .................................. 422/170, 171, 422/177, 180, 211, 222; 60/299; 428/116, 593

(56) References Cited

U.S. PATENT DOCUMENTS 5,328,774 A  *  7/1994  Maus et al. ................ 428/593
5,549,873 A      8/1996  Pott ............................ 422/180

FOREIGN PATENT DOCUMENTS

| DE | 195 04 851 | 8/1995 |
| EP | 0 596 854 A1 | 5/1994 |
| EP | 0 622 530 A1 | 11/1994 |
| EP | 0705 962 A1 | 4/1996 |
| WO | WO 92/02716 | 2/1992 |

* cited by examiner

*Primary Examiner*—Hien Tran
(74) *Attorney, Agent, or Firm*—Laurence A. Greenberg; Werner H. Stemer; Ralph E. Locher

(57) ABSTRACT

A catalytic converter for cleaning exhaust gas from an internal combustion engine, in particular a diesel engine or a lean-burn engine, includes at least one honeycomb body coated with catalytically active material and having passages through which the exhaust gas can flow, walls separating the passages from each other, and first and second zones disposed in succession in a flow direction. The first zone has a lower thermal capacity per unit of volume of the honeycomb body than the second zone and the second zone has a thermal capacity of at least 800 joules per liter and Kelvin [J/lK], preferably at least 900. Sheet metal layers in the first zone preferably have an average uncoated thickness of less than 0.06 mm, preferably less than 0.04 mm. Sheet metal layers in the second zone preferably have an average uncoated thickness of more than 0.06 mm, preferably more than 0.08 mm and in particular 0.11 mm. In that way, the first zone can rapidly reach its operating temperature at high exhaust gas temperatures while the second zone stores heat for operating conditions involving a low exhaust gas temperature.

21 Claims, 1 Drawing Sheet

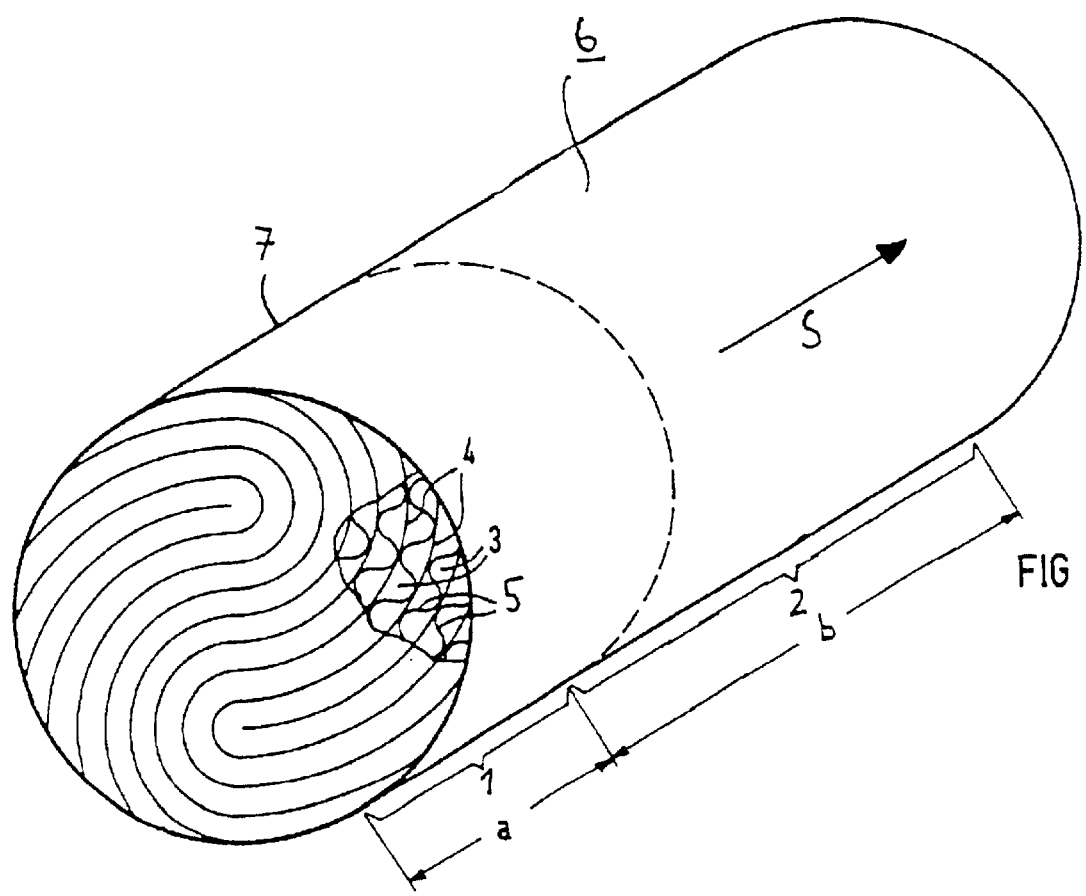

CATALYTIC CONVERTER, DIESEL ENGINE AND LEAN-BURN ENGINE HAVING A CATALYTIC CONVERTER

CROSS REFERENCE TO RELATED APPLICATION

This application is a continuation of copending International Application No. PCT/EP99/02997, filed May 3, 1999, which designated the United States.

BACKGROUND OF THE INVENTION

FIELD OF THE INVENTION

The present invention relates to a catalytic converter for cleaning exhaust gas from an internal combustion engine, in particular a diesel engine or a lean-burn engine, including at least one honeycomb body which is coated with catalytically active material and has passages through which the exhaust gas can flow and walls separating the passages from each other. The converter has a first zone and a second zone disposed in succession in a flow direction and the first zone has a lower thermal capacity per unit of volume of the honeycomb body than the second zone.

In view of an ever-increasing strictness of environmental legislation in many countries, catalytic converters for cleaning exhaust gas have to be adapted with ever-increasing precision to internal combustion engines of motor vehicles and the mode of operation thereof.

In regard to Otto-cycle engine exhaust gas cleaning, it is the known state of the art, for the purposes of reducing the level of pollutant emissions in a cold-start phase, to use a catalytic converter which has a first zone with the lowest possible level of thermal capacity per unit of volume. That is done so that that zone heats up quickly, triggers off the catalytic reaction and, due to heat energy which is produced in that situation, heats up parts of the catalytic converter which are disposed further downstream. An example of such a catalytic converter is described in International Publication No. WO 92/02716, corresponding to U.S. Pat. No. 5,328,774.

Honeycomb bodies with a thermal capacity which is reduced in a front region are also described in U.S. Pat. No. 5,549,873 and European Patent Application 0 705 962 A1, corresponding to U.S. Pat. No. 5,599,509. What is common to all three of those publications is that the first zone involves a smaller surface area than the second zone, thereby substantially achieving the reduction in thermal capacity.

Besides monolithic honeycomb bodies with a first zone having a reduced thermal capacity, many exhaust systems involve structures having two honeycomb bodies. In that case, the first zone has a smaller number of passages per cross-sectional area and thus a lower level of thermal capacity.

A general trend in development in recent years is towards thinner walls in all honeycomb bodies and towards a thermal capacity which overall is as small as possible. The reason for that, besides saving weight, is in particular achieving a desired, minimum possible pressure drop in the exhaust system, in conjunction with the largest possible surface areas per unit of volume.

Those realizations which were essentially obtained in relation to and applied to Otto-cycle engines, relate to conventional engine constructions in which the mixture of exhaust gas and fuel is regulated as accurately as possible to be stoichiometric.

However, those structural concepts cannot be readily transferred to diesel engines or so-called lean-burn engines, that is to say engines which are operated with a considerable excess of air, in particular with direct gasoline injection. In that case, because of the large excess of air in the exhaust gas, substantially lower temperatures result in operation than when stoichiometric operation is involved. It will be appreciated that there is admittedly still a wish for the operating temperature necessary for the catalytic conversion effect to be achieved as quickly as possible in the catalytic converter after the cold-start of the internal combustion engine. However, in subsequent operation and in particular in idle phases, such low exhaust gas temperatures occur, that under some circumstances a catalytic converter is cooled down to below the operating temperature necessary for the catalytic conversion effect, whereupon in a subsequent load phase pollutants are initially discharged into the environment.

SUMMARY OF THE INVENTION

It is accordingly an object of the invention to provide a catalytic converter for cleaning exhaust gas, a diesel engine and a lean-burn engine having a catalytic converter, which overcome the hereinafore-mentioned disadvantages of the heretofore-known devices of this general type and in which the catalytic converter rapidly reaches its operating temperature after a cold-start of the engine, but does not rapidly lose that temperature again in subsequent phases involving a lower exhaust gas temperature.

With the foregoing and other objects in view there is provided, in accordance with the invention, a catalytic converter for cleaning exhaust gas from an internal combustion engine, in particular a diesel engine or a lean-burn engine, comprising at least one honeycomb body coated with catalytically active material, the at least one honeycomb body having passages for conducting an exhaust gas flow, walls mutually separating the passages, and first and second zones disposed in succession in a flow direction, the first zone having a lower thermal capacity per unit of volume of the honeycomb body than the second zone, and the second zone having a particularly high thermal capacity of at least 800 joules per liter and Kelvin [J/lK], preferably at least 900 joules per liter and Kelvin [J/lK].

A decisive feature of the present invention is that of providing a second zone in the catalytic converter with a particularly high level of thermal capacity per unit of volume of the honeycomb body, downstream of the usual zone of low thermal capacity, which is also desired in the present case. Contrary to the development trend, in this case a higher weight and a slightly higher pressure drop is tolerated, so that considerably improved exhaust gas cleaning values are achieved.

The effect of the high thermal capacity in the second zone lies in the storage of heat which can maintain the catalytic reaction for a certain time, when a low exhaust gas temperature is involved.

After the cold-start of the engine, the first zone is rapidly heated up, as is known from the state of the art, and begins with the catalytic conversion of harmful exhaust gas constituents, in particular hydrocarbons and carbon monoxide. That reaction is exothermic and supports the rapid heating effect with respect to the second zone which then begins to store heat. The surface area of the first zone of the catalytic converter is very substantially sufficient for the conversion effect in that cold-start phase, so that the slow increase in temperature of the second zone does not involve any disadvantages in terms of pollutant emissions. In return, in a subsequent phase during operation involving a low exhaust gas temperature, the second zone can continue to maintain the catalytic reaction by virtue of the stored heat while the first zone, because of its low thermal capacity, is rapidly cooled down to below the necessary conversion temperature. In a phase involving a higher exhaust gas temperature, which then follows in turn, the exothermic reaction is very rapidly displaced into the first zone again, whereby the second zone is heated up again and can store fresh heat. That procedure overall results in a uniformly effective exhaust gas cleaning action, even when the engine involves a fluctuating mode of operation, as can occur in particular when driving within towns and urban areas and in corresponding test cycles.

In principle, there are a number of ways of producing a catalytic converter with a second zone having a particularly high thermal capacity. The thermal capacity can be achieved by increasing the wall thickness of the carrier structure and/or by increasing the thickness of the coating. It will be appreciated that in addition it is possible to increase the number of cells per cross-sectional area in relation to the first zone.

In accordance with another feature of the invention, the catalytic converter includes two individual honeycomb bodies which can be disposed in closely adjacent relationship or spatially somewhat separated. In this case, the second honeycomb body has thicker walls than the first honeycomb body.

In accordance with a further feature of the invention, the honeycomb bodies are twisted, stacked or wound from sheet metal layers. The first zone has an average wall thickness, without coating, of less than 0.06 mm, preferably less than 0.04 mm, while the second zone on average has a wall thickness, without coating, of more than 0.06 mm, preferably more than 0.08 mm, in particular 0.11 mm.

In accordance with an added feature of the invention, for production-process and/or mechanical reasons, it may possibly be necessary for different sheet metal layers, in particular the smooth and the corrugated sheet metal layers, to have different thicknesses. In the present case the average thickness of the sheet metal layers is stated. However, it is particularly preferred for all of the sheet metal layers in a zone to be made with the same thickness. Due to the high level of thermal capacity of the stainless steels which are usually employed, the sheet metal thicknesses of more than 0.08 mm, which heretofore were scarcely considered for metal honeycomb bodies, permit the storage of a considerable amount of heat which can then keep a ceramic washcoat present in the form of a coating on the sheet metal layers at operating temperature for a certain time, even if the exhaust gas temperature falls sharply.

In accordance with an additional feature of the invention, alternatively or in addition, the thickness of the coating in the first and the second zones may be different in a catalytic converter so that, in the first zone, the total thickness of the walls, with coating, is less than 0.08 mm while the total thickness in the second zone is greater than 0.1 mm, preferably greater than 0.12 mm. That is a possible way of providing two zones of different thermal capacities, in particular for monolithic honeycomb bodies including a carrier material of the same thickness throughout.

In accordance with yet another feature of the invention, in order to have sufficient surface area for the catalytic conversion effect in the cold-start phase in spite of the second zone heating up slowly, the first zone should have an axial length of 10 to 60 mm, preferably from 20 to 50 mm. Overall, however, the second zone should be at least twice as great in axial length as the first zone. A number of at least 360 cpsi (cells per square inch) has proven to be desirable for both zones.

With the objects of the invention in view, there is also provided a diesel engine, in particular of a motor vehicle, comprising an exhaust system having a catalytic converter for cleaning exhaust gas, the catalytic converter having at least is one honeycomb body coated with catalytically active material, the at least one honeycomb body having passages for conducting an exhaust gas flow, walls mutually separating the passages, and first and second zones disposed in succession in a flow direction, the first zone having a lower thermal capacity per unit of volume of the honeycomb body than the second zone, and the second zone having a thermal capacity of at least 800 joules per liter and Kelvin [J/lK], preferably at least 900 joules per liter and Kelvin [J/lK].

With the objects of the invention in view, there is additionally provided a lean-burn engine, in particular of a motor vehicle with direct gasoline injection, comprising an exhaust system having a catalytic converter for cleaning exhaust gas, the catalytic converter having at least one honeycomb body coated with catalytically active material, the at least one honeycomb body having passages for conducting an exhaust gas flow, walls mutually separating the passages, and first and second zones disposed in succession in a flow direction, the first zone having a lower thermal capacity per unit of volume of the honeycomb body than the second zone, and the second zone having a thermal capacity of at least 800 joules per liter and Kelvin [J/lK], preferably at least 900 joules per liter and Kelvin [J/lK].

Other features which are considered as characteristic for the invention are set forth in the appended claims.

Although the invention is illustrated and described herein as embodied in a catalytic converter, a diesel engine and a lean-burn engine having a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagrammatic, perspective view of an embodiment of a catalytic converter according to the invention.

DESCRIPTION OF THE PREFERRED EMBODIMENTS

Referring now in detail to the single FIGURE of the drawing, there is seen a catalytic converter having a honeycomb body 6. That honeycomb body has a first axial zone 1 with an axial length a and a second axial zone 2 with an axial length b. Exhaust gas from an internal combustion engine, in particular a diesel engine or a lean-burn engine, flows through the honeycomb body 6 in a flow direction S. It should be pointed out that the honeycomb body 6 can be a monolithic honeycomb body in which the zones 1, 2 involve different thermal capacities. However, the configuration can also be such as to include two separate honeycomb bodies for the two zones 1, 2 which are then disposed in a common tubular casing 7. The honeycomb body in accordance with the illustrated embodiment is constructed from respective smooth and corrugated sheet metal layers 4 and 5 which are twisted together in opposite directions and which form passages 3 through which exhaust gas can flow. In a preferred embodiment, the thickness of all of the metal sheets in the first zone 1 is about 0.03 mm whereas in the second zone 2 it is about 0.11 mm. That gives the second zone a thermal capacity with a coating of over 900 J/lK.

The present invention permits effective exhaust gas cleaning under fluctuating operating conditions of a diesel engine or a lean-burn engine. The construction according to the invention is simple, advantageous in terms of cost and suffers from only slight disadvantages with respect to weight and pressure drop.

We claim:

1. A catalytic converter for cleaning exhaust gas from an internal combustion engine, comprising:
    at least one honeycomb body coated with catalytically active material, said at least one honeycomb body having passages for conducting an exhaust gas flow, walls mutually separating said passages, and first and second zones disposed in succession in a flow direction, said first zone having a lower thermal capacity per unit of volume of said honeycomb body than said second zone, and said second zone having a thermal capacity of at least 800 joules per liter and Kelvin [J/lK].

2. The catalytic converter according to claim 1, wherein said thermal capacity of said second zone is at least 900 joules per liter and Kelvin [J/lK].

3. The catalytic converter according to claim 1, wherein said at least one honeycomb body is wound, layered or twisted from at least partially structured sheet metal layers forming said walls separating said passages;
    said sheet metal layers in said first zone have an average uncoated thickness of less than 0.06 mm; and said sheet metal layers in said second zone have an average uncoated thickness of more than 0.06 mm.

4. The catalytic converter according to claim 2, wherein said sheet metal layers in said first zone have an average uncoated thickness of less than 0.04 mm.

5. The catalytic converter according to claim 2, wherein said sheet metal layers in said second zone have an average uncoated thickness of more than 0.08 mm.

6. The catalytic converter according to claim 2, wherein said sheet metal layers in said second zone have an average uncoated thickness of 0.11 mm.

7. The catalytic converter according to claim 1, wherein said coated walls have a thickness smaller than 0.08 mm in said first zone and greater than 0.1 mm in said second zone.

8. The catalytic converter according to claim 1, wherein said coated walls have a thickness smaller than 0.08 mm in said first zone and greater than 0.12 mm in said second zone.

9. The catalytic converter according to claim 1, wherein said at least one honeycomb body includes two separate honeycomb bodies respectively forming said first zone and said second zone.

10. The catalytic converter according to claim 1, wherein said at least one honeycomb body is a monolithic honeycomb body in which said first zone and said second zone are formed.

11. The catalytic converter according to claim 7, wherein said first zone and said second zone are formed by coatings having different thicknesses.

12. The catalytic converter according to claim 1, wherein said first and second zones have axial lengths, and said axial length of said second zone is at least twice as great as said axial length of said first zone.

13. The catalytic converter according to claim 1, wherein said first zone has an axial length of 10 to 60 mm.

14. The catalytic converter according to claim 1, wherein said first zone has an axial length of 20 to 50 mm.

15. The catalytic converter according to claim 1, wherein said first zone and said second zone have an approximately equal number of passages per cross-sectional area.

16. The catalytic converter according to claim 15, wherein said first zone and said second zone have greater than 360 cpsi (cells per square inch).

17. The catalytic converter according to claim 1, wherein said first zone and said second zone have a substantially equal specific surface area per unit of volume.

18. A diesel engine, comprising:
    an exhaust system having a catalytic converter for cleaning exhaust gas, said catalytic converter having at least one honeycomb body coated with catalytically active material, said at least one honeycomb body having passages for conducting an exhaust gas flow, walls mutually separating said passages, and first and second zones disposed in succession in a flow direction, said first zone having a lower thermal capacity per unit of volume of said honeycomb body than said second zone, and said second zone having a thermal capacity of at least 800 joules per liter and Kelvin [J/lK].

19. The diesel engine according to claim 18, wherein said thermal capacity of said second zone is at least 900 joules per liter and Kelvin [J/lK].

20. A lean-burn engine, comprising:
    an exhaust system having a catalytic converter for cleaning exhaust gas, said catalytic converter having at least one honeycomb body coated with catalytically active material, said at least one honeycomb body having passages for conducting an exhaust gas flow, walls mutually separating said passages, and first and second zones disposed in succession in flow direction, said first zone having a lower thermal capacity per unit of volume of said honeycomb body than said second zone, and said second zone having a thermal capacity of at least 800 joules per liter and Kelvin [J/lK].

21. The lean-burn engine according to claim 20, wherein said thermal capacity of said second zone is at least 900 joules per liter and Kelvin [J/lK].

* * * * *